United States Patent [19]

Wattles et al.

[11] Patent Number: 4,593,631
[45] Date of Patent: Jun. 10, 1986

[54] ORGANIC FIBROUS MATERIAL PROCESSING APPARATUS AND SYSTEM

[75] Inventors: Gurdon B. Wattles, North Haven; Donald L. Pihl, Guilford, both of Conn.

[73] Assignee: Safety Railway Service Corporation, New Haven, Conn.

[21] Appl. No.: 311,750

[22] Filed: Oct. 15, 1981

Related U.S. Application Data

[63] Continuation of Ser. No. 150,918, May 19, 1980, abandoned, which is a continuation of Ser. No. 900,150, Apr. 26, 1978, abandoned.

[51] Int. Cl.⁴ ............................................. F23J 11/00
[52] U.S. Cl. .................... 110/345; 110/215; 110/106; 110/244; 241/188 R
[58] Field of Search .............. 110/218, 220, 244, 106; 241/188 R, 188 A

[56] References Cited

U.S. PATENT DOCUMENTS

| | | | |
|---|---|---|---|
| 1,628,609 | 5/1927 | Newhouse | 110/106 |
| 2,148,447 | 2/1939 | Dundes et al. | 110/220 |
| 3,043,525 | 7/1962 | Gilbert | 110/106 |
| 3,250,016 | 5/1966 | Agarwal | 110/106 |
| 3,387,574 | 6/1968 | Mullen | 110/244 |
| 3,907,674 | 9/1975 | Roberts et al. | 110/215 |
| 3,970,255 | 7/1976 | Foster | 241/188 |
| 4,047,489 | 9/1977 | Voorheis et al. | 110/346 |

*Primary Examiner*—Henry C. Yuen
*Attorney, Agent, or Firm*—Nelson E. Kimmelman; Louis Weinstein

[57] ABSTRACT

Partially wet organic fibrous material is centrifugally impacted in a hot exhaust gas atmosphere such as flue gas to defiberize and dry the material. Then the material is separated from the hot exhaust gas by fluid energy. In one form of the invention, the separated material is burned in a prime combustion zone thereby producing hot flue gas which is fed back to the centrifugal impacting zone.

8 Claims, 8 Drawing Figures

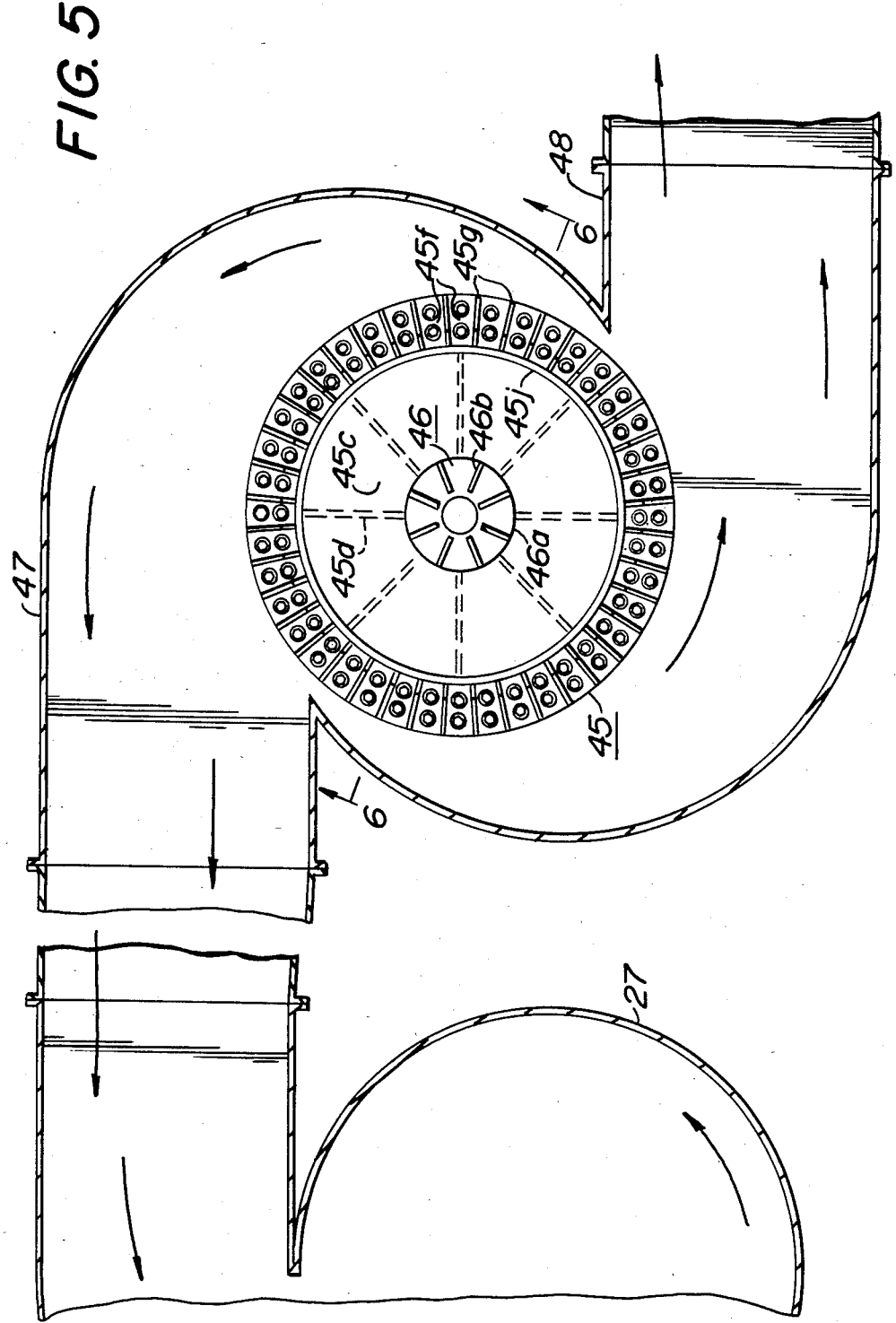

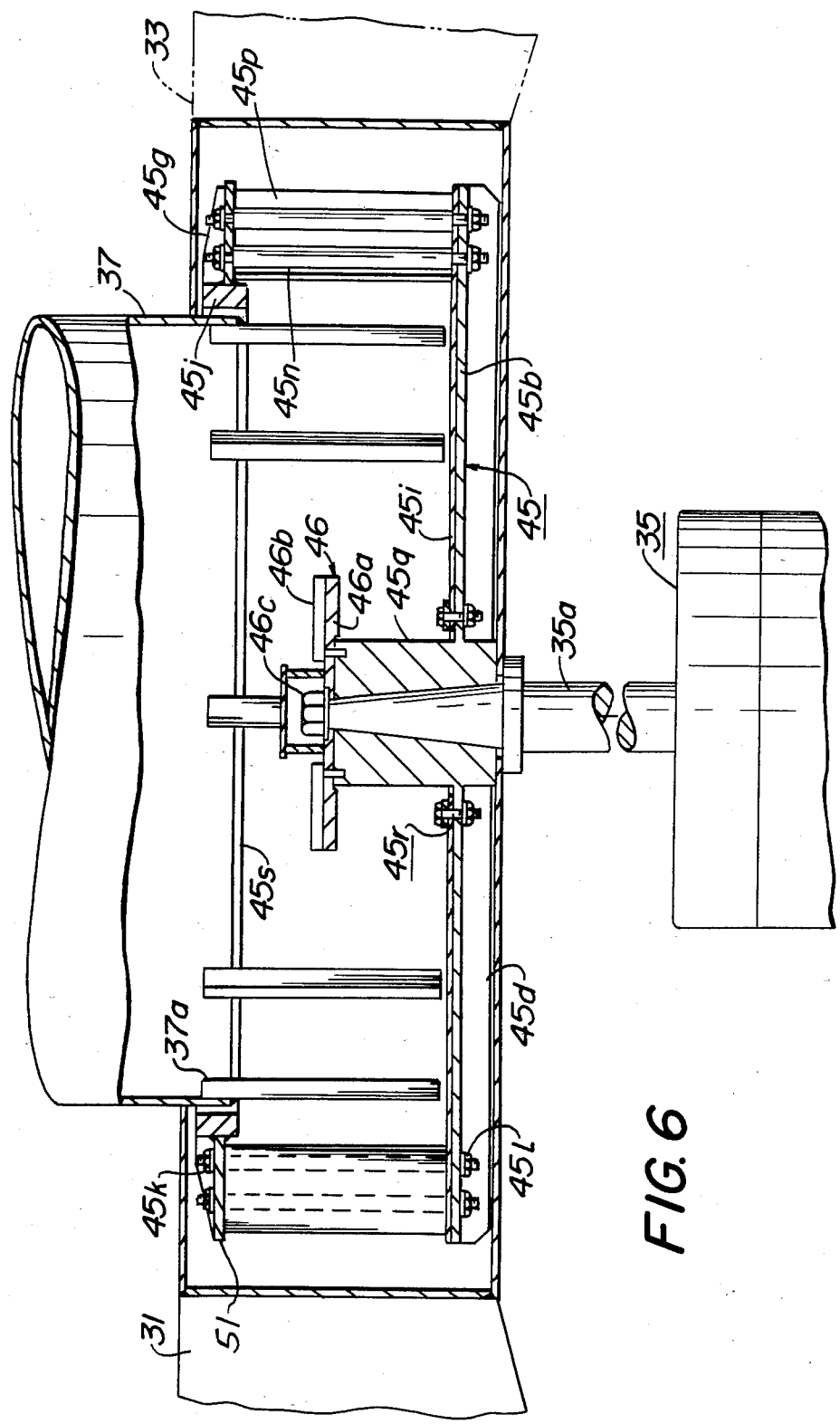

ORGANIC FIBROUS MATERIAL PROCESSING APPARATUS AND SYSTEM

This is a continuation of Ser. No. 150,918, filed May 19, 1980, now abandoned which is a continuation of Ser. No. 900,150, filed Apr. 26, 1978, now abandoned.

BACKGROUND OF THE INVENTION

Field of the Invention

This invention relates to systems for increasing the efficiency of processing organic fibrous materials and especially to the utilization of waste fibrous material such as bagasse.

In the past, in order to reclaim heat that would otherwise be lost in the exhaust gases produced by the burning of bagasse in boilers, a number of approaches have been tried. One was to extract the heat from the flue gas to preheat the combustion and excess air. Another was to preheat the make-up water used in the steam plant. While some of these efforts have been successful, the system described herein offers even more efficient usage of the bagasse as a fuel.

Recently, bagasse has been known to have an increasing amount of dirt or foreign materials thus requiring a preliminary washing and wet cleaning of the cane. As a result, the cleaned bagasse has greater inherent moisture than ever before. This increased moisture content means that the bagasse, when burned, does not produce as much heat value. Furthermore, ever increasing steam loads are required as a result of anti-pollution statutes requiring the scrubbing of boiler flue gases. Currently, the deficiency in the required energy (over and above the heat value of the bagasse) is made up by using electricity from the grid. This is costly and indirectly means that more purchases of foreign oil are necessary. Alternatively, increased amounts of oil are consumed directly in the sugar mill boiler.

The approach taken by the present inventors has been different because they propose that the heat reclamation may be enhanced by upgrading the boiler fuel in both heat value and completeness of combustion. As a result of this approach, the heat value can be made to approach 50% and more complete combustion is accomplished contributing to cleaner flue gas. Using this novel system the moisture content of the bagasse applied to the boiler can be reduced from 52% to 40% or less. This, in turn, reduces evaporative losses due to the latent heat of the moisture and enables combustion at a higher temperature thereby permitting more complete combustion. The net heat value produced in a typical conventional system wherein the input bagasse has 50% moisture is about 2400 BTU/lb. The present system can improve this by 50% so as to achieve 3600 BTU/lb.

Another advantge of this novel system is that the boiler can be used closer to its maximum output rating since there is a smaller evaporative heat loss. Presently when 52% moisture bagasse is to be burned, it is customary to reduce the feed rate to the boiler because of the necessity of furnishing a large amount of excess air. If the moisture content of the bagasse is lowered to about 40%, the excess air can be cut by 35-40% and most conventional boilers may be operated close to their maximum ratings.

SUMMARY OF THE INVENTION

Organic fibrous material is centrifugally impacted in a hot exhaust gas atmosphere and then the impacted material is separated from the gas. In one form of the invention, the separated material is then burned in a combustion zone which supplies the hot flue gas for the centrifugal impacting step.

BRIEF DESCRIPTION OF THE DRAWINGS

FIG. 5 is a plan view, in section, taken along the section lines 5—5 of FIG. 4;

FIG. 6 is an enlarged sectional and side elevational view, of part of the apparatus shown in FIG. 4;

DETAILED DESCRIPTION OF THE DRAWINGS

Figure 1:
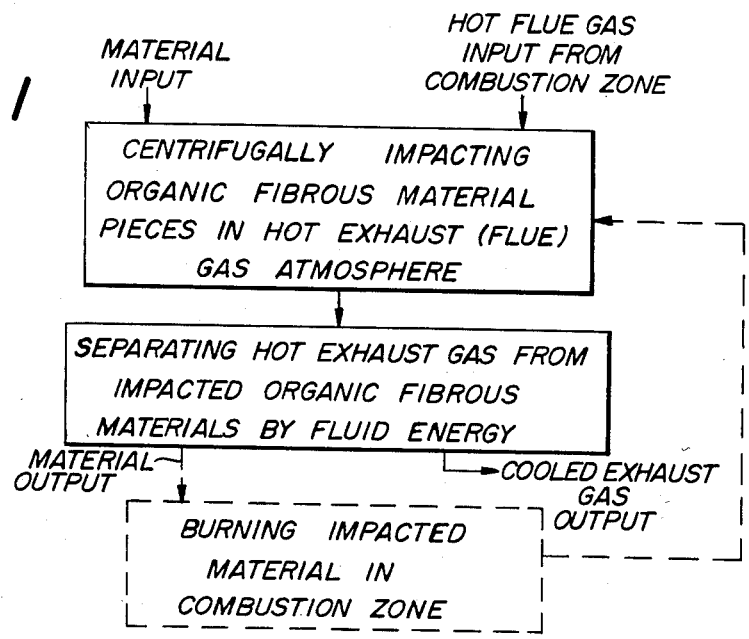
FIG. 1 is a block diagram of the principal processing steps of the present invention.

FIG. 1 is a block diagram of the main steps of the present invention. First, the organic fibrous material such as bagasse from a sugar mill is applied together with hot flue gas from a boiler furnace to a centrifugal impacting zone. In that zone the impacting rotor reduces the size of the bagasse which is, at the same time, dried by the heat from the flue gas.

The small defiberized and dried bagasse particles are then applied to a zone in which the flue gas is extracted. This extraction zone is energized by the same flue gas which is used to energize fluid energy separation equipment such as a cyclone. The heavier bagasse particles drop out of the bottom of the cyclone under the influence of gravity and the exhaust gas in which they are suspended is removed from the top of the cyclone. At that point, then, there is a product consisting of bagasse particles which have been dried so that their moisture content is far below the 50-52% moisture content characteristic of conventional systems. These particles can be stored, for example, for later use or be applied directly to a combustion zone as shown in the broken-line block. The broken-line return arrow indicates that the hot flue gas produced in the combustion zone may be fed back to the centrifugal impacting zone.

Figure 2:
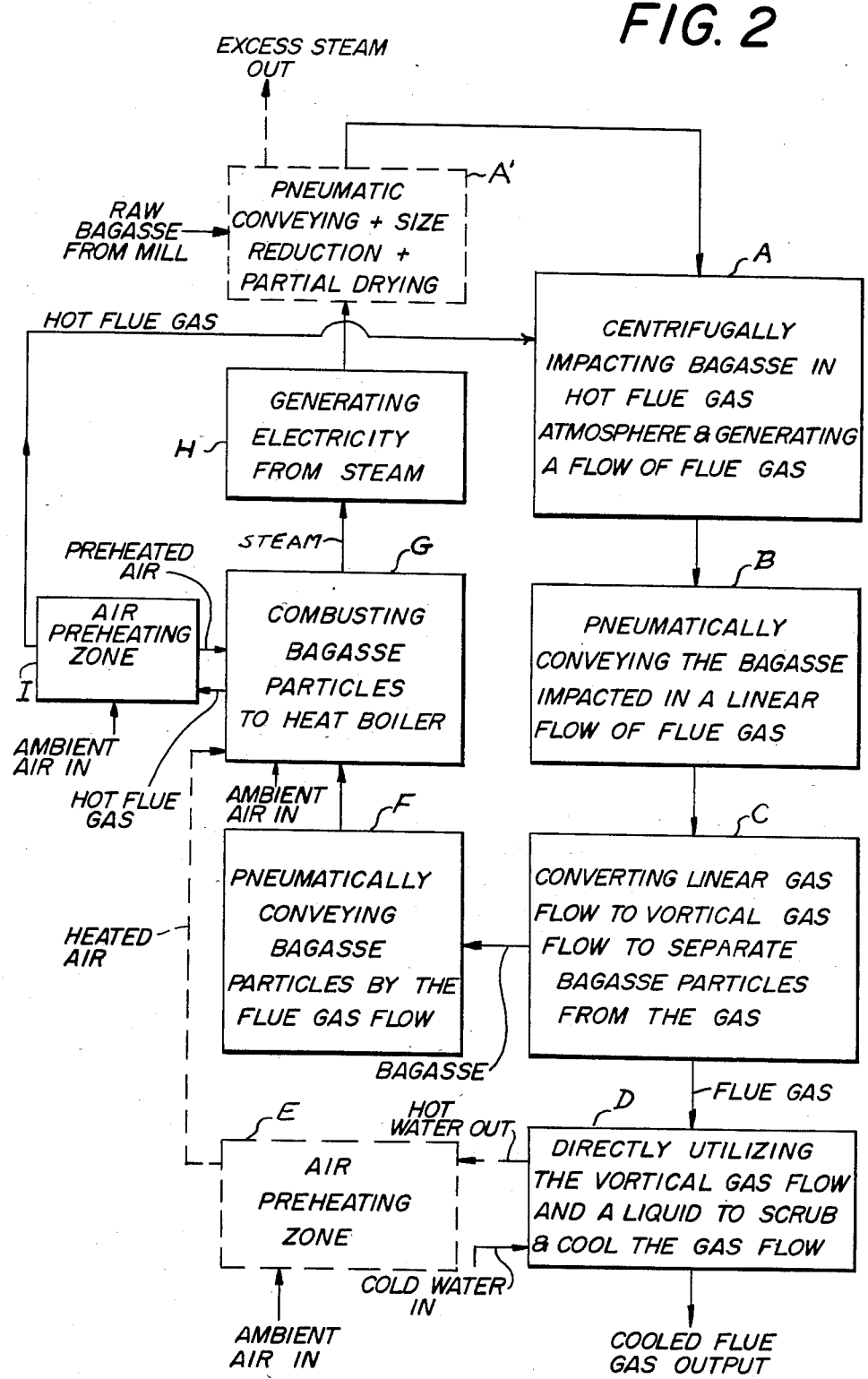
FIG. 2 is a more detailed block diagram showing one embodiment of the present invention.

FIG. 2 is a more complex block diagram of the present invention with intermediate steps also being shown. Raw bagasse from the sugar mill which has been cleaned (by water) to remove dirt and other foreign materials may be applied either directly or indirectly to the centrifugal impacting zone as shown in box A. It may alternatively be preliminarily subjected to the pneumatic conveying, size reduction and partial drying steps shown in the broken-line box A' thereby producing excess steam. In the centrifugal impacting zone it is centrifugally impacted in hot flue gas. The centrifugal impacting step initially generates a vortical flow of the flue gas in which the impacted bagasse particles are entrained. The output of the impacting apparatus is so constructed as to convert the natural gas flow to a linear flow that pneumatically conveys the bagasse particles as shown in block B. The linear gas flow is then recoverted, as shown in block C, in the input to a cyclone, for example, to a vortical gas flow whose centrifugal force operates to separate the bagasse particles from the gas. These particles are then entrained by a part of the flue gas (block F) to the boiler (block G) together with some ambient air for combustion in the boiler.

Some of the flue gas issuing from the cyclone can be applied, together with a liquid such as water, to a scrubbing zone (block D) directly utilizing the vortical gas flow characteristics. The scrubbing zone produces a cooled and scrubbed flue gas output which complies with antipollution statutes or regulations, for example.

The hot water produced by the heat exchange of the heat of the flue gas to the input cold water can be used to supply the heat to an optional air preheating zone as shown in the broken-line box E to which ambient air is also applied. This heated ambient air is then used as the pre-heated air for combustion purposes in the best boiler as shown by the broken-line arrow.

If there is an air preheating zone (block I) associated with the boiler, it may be energized, as shown, by the hot flue gas which heats the ambient air input. The air preheating zone I then applies the preheated ambient air as the combustion air for the boiler. The flue gas applied to the air preheating zone still has heat value so it is taken from that zone and fed back to the centrifugal impacting zone A to provide most of the atmosphere for the centrifugal impacting operation.

The boiler also generates steam which is applied to a generator (block H) as shown wherein electricity is produced. This electricity can be applied, for example, to the optional preliminary zone A' for partially drying the raw bagasse from the mill; the main drying operation is still accomplished in the centrifugal impacting zones.

Figure 3:
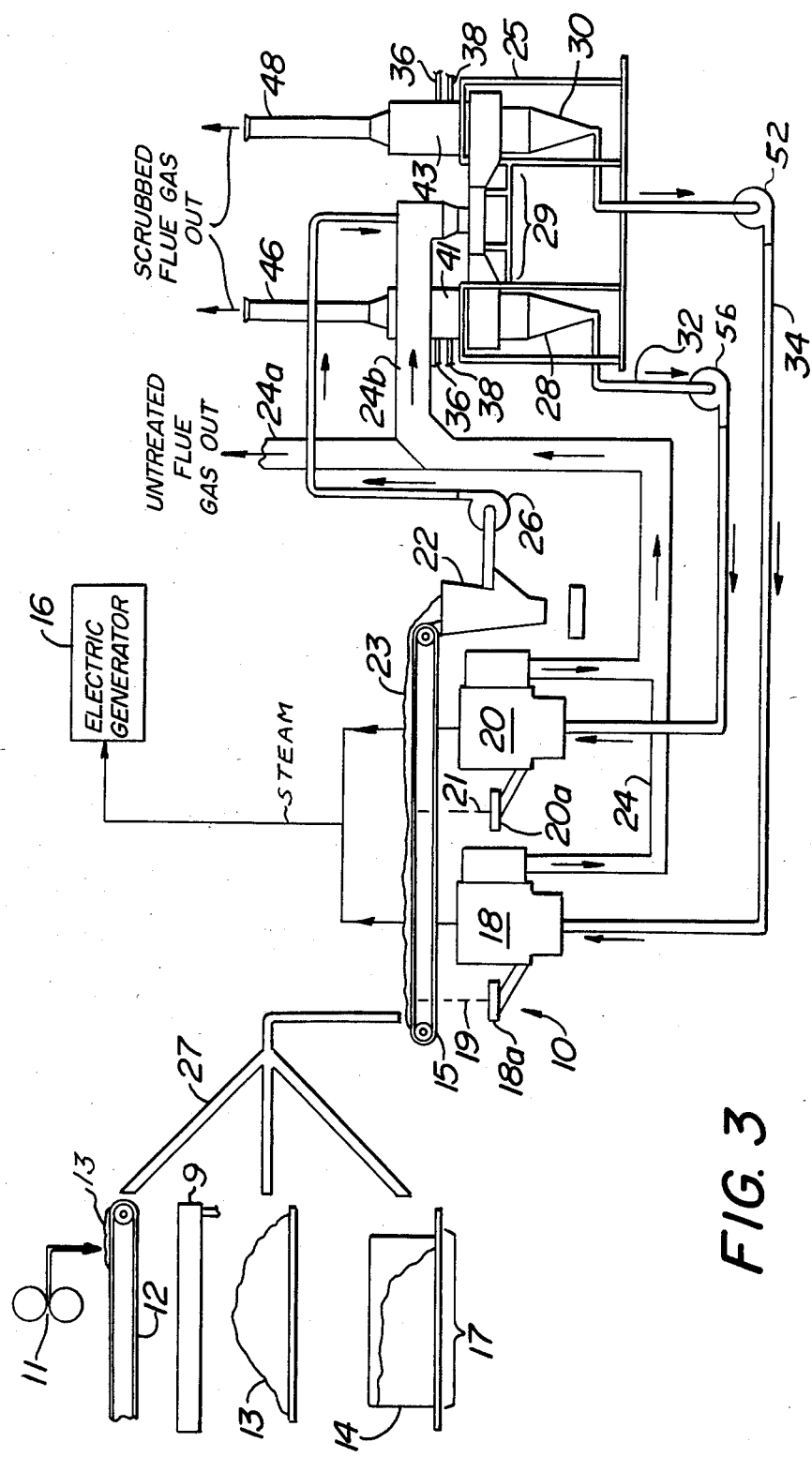
FIG. 3 is a schematic diagram of the processing according to one embodiment of the present invention.

In FIG. 3 a system 10 employing two boilers, two cyclones and two scrubbers is shown. At the numeral 11 the rollers of a conventional sugar cane processing mill producing bagasse 13 on a conveyer 12, for example, are shown. The bagasse may be applied by any of the paths 27 as shown to the top side of the belt of another conveyor 15.

Alternatively, the bagasse proceeding from the mill may be stored for a while under a shed roof 9 and then applied to the distribution network 27 onto the conveyor 15. In another example, the bagasse may be stored in a warehouse 14 and then applied to the network 27.

Once it has been placed on the conveyor 15, the bagasse 23 is fed to an aspirator 22 which separates out the tramp materials such as rocks, metals, machete blades, etc. that may inadvertently have been present in the bagasse. The bagasse is then conveyed pneumatically by the action of a fan 26 to the input of a centrifugal impacting mill shown generally at the numeral 29. In a preferred form, this mill will be so constructed as to not only centrifugally impact the bagasse in an atmosphere comprised substantially of the hot flue gases from the exhausts of the boiler assemblies 18 and 20, but also to produce a strong flow of that gas to convey pneumatically the impacted and defiberized bagasse particles to the two cyclones 28 and 30.

In the cyclones 28 and 30, the creation of a vortical flow of flue gas separates the flue gas from the bagasse particles which drop out the bottoms thereof and are conveyed back through ducts 32 and 34 by fans 51 and 52 respectively to the two boilers 18 and 20 wherein they are burned as fuel.

The boilers produce steam which is applied to an electrical generator 16 so as to supply current, for example, for the preliminary drying of the bagasse prior to its application to the centrifugal impacting zone, for example, as explained in connection with the explanation of block A' in FIG. 2.

The flue gas separated from the impacted particles by cyclones 28 and 30 may pass directly out to the atmosphere or, if desired for anti-pollution reasons, may be subjected to a scrubbing first. As shown in FIG. 3, the numerals 41 and 43 respectively indicate where, in the apparatus, scrubbers may conveniently be located for respective association with the cyclones 28 and 30. For the scrubber shown at 41, there may be input and output liquid pipes 38 and 36; similarly for the scrubber shown in the area 43, there may be input and output liquid pipes. To these pipes waste water from the sugar plant may be supplied for use as the scrubbing medium. The output of the scrubbers is relatively clean, cooled flue gas whereas the unscrubbed flue gas goes out into the atmosphere in stack 24a.

In accordance with a highly desirable feature of one form of the present invention, the centrifugal impacting-drying apparatus indicated at the numeral 29 may be so constructed so as to generate a flow of gas that energizes both of the cyclones 28, 30 and both of the scrubbers in the regions 41 and 43.

The broken lines 19 and 21 indicate direct application of the bagasse to input chutes of the boilers 18 and 20 respectively in case of emergency or for any other desired reason.

While the system has been shown with two boilers and two cyclones, it should be understood that the system is equally applicable to a single boiler and a single cyclone.

Figure 4:
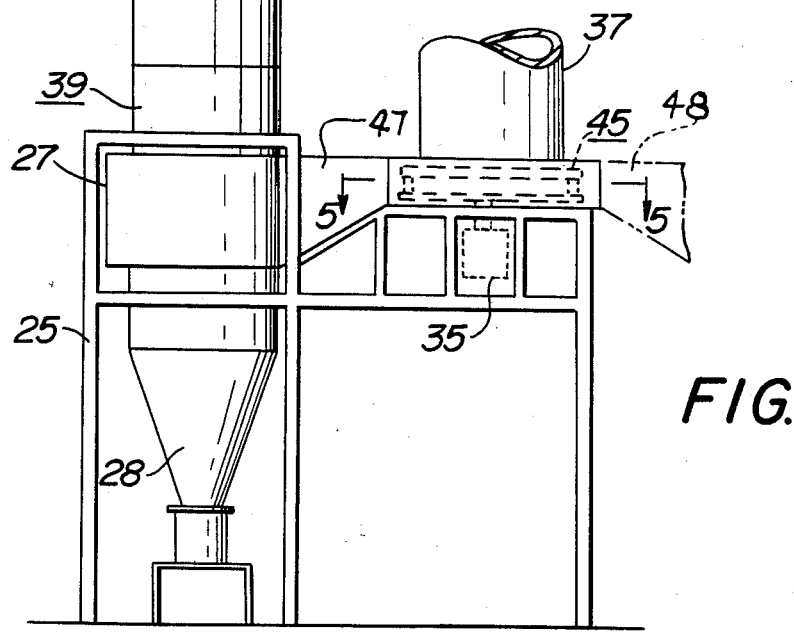
FIG. 4 is an enlarged portion of the system shown in FIG. 3.

FIG. 4 shows in enlarged form the structure of part of the apparatus shown in FIG. 3 supported by a frame 25. The sections 47 and 48 are the transition ducts from the double-scroll output of the impacting apparatus 29 shown in more detail in FIG. 5. The rotor 45 is shown in broken lines and is attached to a drive shaft 35a (FIG. 6) which extends upwardly from a motor 35. An input chute 37 for the bagasse and flue gas is shown and is characterized by a very large cross-section relative to the diameter of the rotor since there is a high volume of gas to be accommodated. Within the housing at the numeral 39, an optional scrubber (shown in FIG. 7) may be located.

Figure 8:
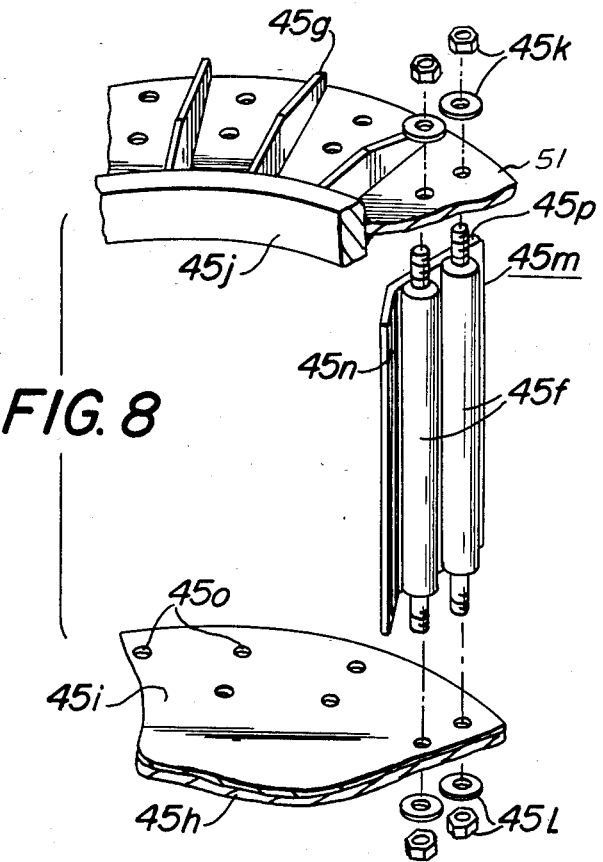
FIG. 8 is an exploded, partly sectional view of the rotor shown in FIG. 6.

FIGS. 5, 6, 7 and 8 will be considered together. As shown in FIG. 6, there is a centrifugal impacting rotor 45 which, in a preferred embodiment, has the features shown. This rotor not only causes centrifugal impacting of the bagasse applied from the input chute 37, but also sets up an intense flow of the flue gas which is conveyed by the transition ducts 47 and 48 to the associated input sections of the cyclones such as the section 27 for cyclone 28, for example. Since two cyclones are shown, the output of centrifugal impacting apparatus is applied through the duct sections 47 and 48 to the two inputs of the cyclones. This strong flow of gas is produced by the special construction of the impacting elements that are welded to the support bars 45f as shown in FIG. 8. The impactors have angled impact sections 45n which may be at about 40°–45° relative to the plane of the fan sections 45p of the rotor 45. A number of these impacting elements are arranged around the periphery of the rotor, the support elements 45f also serving as spacers for the top rotor annulus 51 and the bottom rotor annuli 45i and 45b. The ends of the supporting and spacing elements 45f are threaded, as shown, and pass through apertures in the top rotor annulus 51 and in the bottom annuli 45i, 45b. They are secured by nut-washer assemblies 45k and 45l respectively. There may be as many as 40 of these impactors arranged as shown. The top rotor disc 51 is welded to a circular reenforcing ring 45j as shown. Also located on the top surface of the rotor annulus 51 are a plurality of reenforcing radial members 45g welded to the upper surface of ring 45j and to the ring 45j.

The hub 45q of the rotor also has attached to it a flinger or distributor sub-assembly indicated generally at the numeral 46. The flinger consists of a disc mounted concentrically on the end of the spindle and secured by the nut 46c which also secures the rotor generally to the spindle. On the upper side of the disc 46a there are a plurality of vanes or blades 46b which are radially disposed and attached, as by welding, to the top of the disc 46a. It is the function of this flinger sub-assembly to help to distribute the incoming bagasse particles equally about the space within the rotor 45 so as to help avoid build-up of such material in any one place.

Another feature of the present invention is the provision of the bars 37a welded or otherwise attached to the interior wall of the input chute 37 toward its lower end. These bars 37a are spaced equidistantly from one another in a circle and their lower ends barely clear the top surface of the rotor disc 45i. It is the function of these bars to help prevent the accumulation of bagasse particles on the rotor impactors by providing a stationary surface against which the bagasse accumulation is impacted and thereby dislodged. The described impacting of the bagasse against the bar 37a provides additional particle size reduction of the bagasse.

Figure 7:
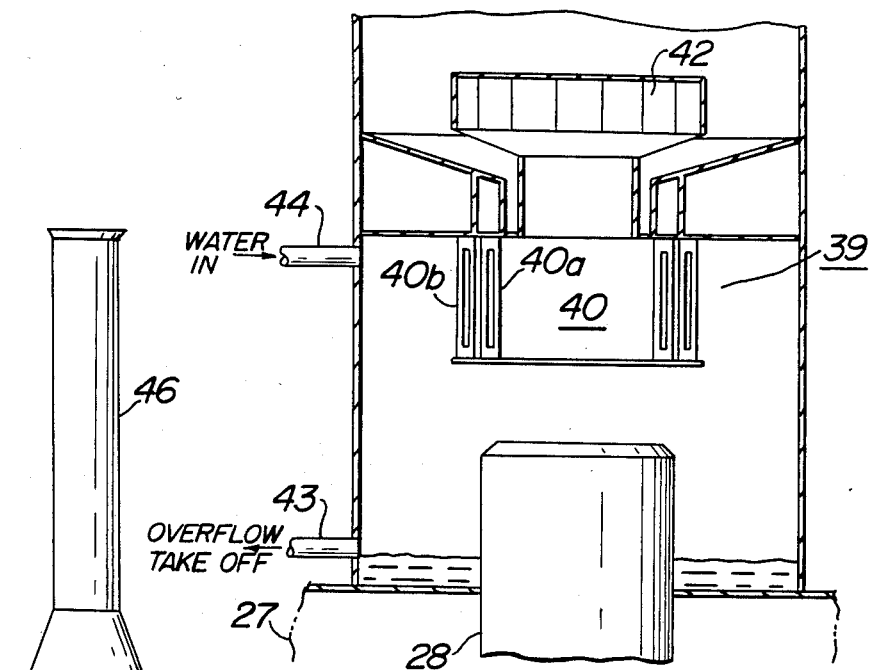
FIG. 7 is a sectional view of an optional part of the system shown in FIG. 4.

In some installations, it is either necessary or desirable to scrub the particulate-laden hot flue gas from the drying-impacting stage before release into the atmosphere. For this purpose, as stated above, the scrubber 39 may be used placed atop and concentric with the cyclone 28 (or 30 if two are being used). As shown in FIG. 7, the scrubber may take the form of one manufactured by Entoleter, Inc., under the trademark "Centri-Field." This type of scrubber depends upon an inwardly spiralling flow of gas to be scrubbed and a liquid to contact the gas flow. Its principle of operation is described in U.S. Pat. No. 3,566,582 issued Mar. 2, 1971. Since the input to the cyclone in the inlet 27 is a vortical flow of gas, this flow can be used for scrubbing as well as for the cyclonic separation step. The gas issues from the top of the cyclone in a vortical pattern and swirls around the outer circular row of vanes 40b which may be slotted in accordance with the teachings of said patent and U.S. Pat. No. 3,881,895 issued to G. B. Wattles May 6, 1975. The vanes are so oriented that the gas enters through the first ring of vanes 40b entraining water particles supplied by the inlet 44. It then passes through a second row of slotted vanes 40a and within the space surrounded by this second row is created a high intensity cloud containing a gradient of various sized water particles, the larger ones being disposed more outwardly and the smaller ones more inwardly. This, of course, is due to the centrifugal-centripetal effect produced by the incoming gas. The gas passes through this cloud and loses its gaseous and solid components such as fly ash and proceeds upward into the second part where there is a water particle de-entrainer 42. The gas, of course, proceeds past this de-entrainer and upwardly and outwardly from the stack 46. Water caught by the de-entrainer 42 falls down onto the sloping conical surface and back into the scrubbing zone. The largest water particles that succeed in escaping outwardly through the slots in the outer ring of vanes 40b will collect against the cylindrical wall and flow downward for reagglomeration and possible disposal through the overflow take-off pipe 43.

The construction of this scrubber is such as to efficiently trap the particulate matter in the exhaust and absorb the gas without running into the problems experienced in bed-type scrubbers that may be become blinded by the particulates. It is also seen that a scrubber of this type utilizes the vortical energy of the gas input to the cyclone. Such a scrubber, by maintaining the contacting cloud, is able to operate with much less liquid and much less of a pressure requirement.

While the invention has been described in terms of processing bagasse, it is equally applicable to other organic fibrous materials such as corn stalks, cereals, paper, tree bark, dried leaves, and the like.

Actual field tests have proven that this system is capable of reducing the moisture content of the bagasse to below 35%. The net effect on a typical boiler is to increase the net heat work produced as steam from 2300 BTU/lb of bagasse at 52% moisture to 3600 BTU/lb resulting in an increase in steam energy output of approximately 55%. When using the type of scrubber just described, pressure drops of from 2 inches to 3 inches WC. are all that are required to clean the flue gas.

The system can reduce the input bagasse pieces, which may be in the 2"-5' range to particles of 1/16"-1/32" material. This results in increased surface area for more complete and quicker combustion when the processed and dried bagasse is fed to a boiler.

The centrifugal impacting-defiberizing drier 29, with its unique construction, does not lose energy in milling the small particles which are thrown out through the impactors. Only the heavier or larger particles remain within the confines of the ring of impactors until they themselves have been reduced to a size that can pass through the spaces between the impactors.

With the present system, a capability of processing bagasse having a 50%–60% moisture content is achieved with a 100,000 ACFM input of flue gas for a 25-30 tons per hour through-put. The output can be bagasse particles having a 36%-40% moisture content.

What is claimed is:

1. A method of processing fibrous organic material comprising:
    (a) centrifugally impacting said materials by feeding them centrally within a processing zone whence they are flung outwardly by centrifugal force against impactors in an atmosphere which principally comprises substantially all of the gas exhausted from a combustion zone,
    (b) applying said impacted material entrained in said gas to a separation zone wherein said material is separated from said gas, said zone being energized and operated substantially only by the fluid energy of said gas, and
    (c) applying said separated material as a fuel for said combustion zone.

2. A method of processing fibrous organic material comprising:
    (a) centrifugally impacting said materials in an atmosphere which principally comprises gas exhausted from a combustion zone, (b) pneumatically conveying said impacted material in a linear flow of flue gas,
(c) separating said impacted material from said flue gas while converting said linear gas flow to vortical gas flow,
(d) pneumatically conveying said separated material to a combustion zone,
(e) combusting said conveyed material and producing flue gas, and
(f) applying said flue gas back to said centrifugal impacting step.

3. The method according to claim 2 wherein after step (c) there is added the step of directly utilizing said vortical gas flow produced in said step (c) with a dispersed liquid thereby to scrub and cool said vortical gas flow.

4. A method of processing fibrous organic material comprising:
(a) centrifugally impacting said materials in an atmosphere which principally comprises gas exhausted from a combustion zone,
(b) applying said impacted material entrained in said gas to a separation zone wherein said material is separated from said gas and a vortical flow of said separated gas is produced,
(c) applying said vortical flow of separated gas directly to energize a scrubbing zone, and
(d) applying said separated material directly to said combustion zone as a fuel.

5. The method according to claim 4 wherein the output of said scrubbing zone includes a heated liquid and wherein said heated liquid is used to heat air for application to said combustion zone.

6. A method of processing fibrous organic material comprising:
(a) subjecting said material to a preliminary heating to promote reduction of moisture therein,
(b) centrifugally impacting said preheated materials in an atmosphere which principally comprises gas exhausted from a combustion zone,
(c) applying said impacted material entrained in said gas to a separation zone wherein said material is separated from said gas,
(d) applying said material directly to said combustion zone as a fuel,
(e) generating electricity from heat produced in said combustion zone, and
(f) using said electricity to perform said preliminary heating in step (a) above.

7. The method of claim 6 wherein preliminary size reduction of said material occurs simultaneously with said preliminary heating.

8. A method of processing fibrous organic material comprising:
(a) centrifugally impacting said materials in an atmosphere which principally comprises gas exhausted from a combustion zone,
(b) continuously mechanically dislodging said material which accumulates in the region where it is impacted,
(c) applying said impacted material entrained in said gas to a separation zone wherein said material is separated from said gas, and
(d) applying said material directly to said combustion zone as a fuel.

* * * * *